UNITED STATES PATENT OFFICE.

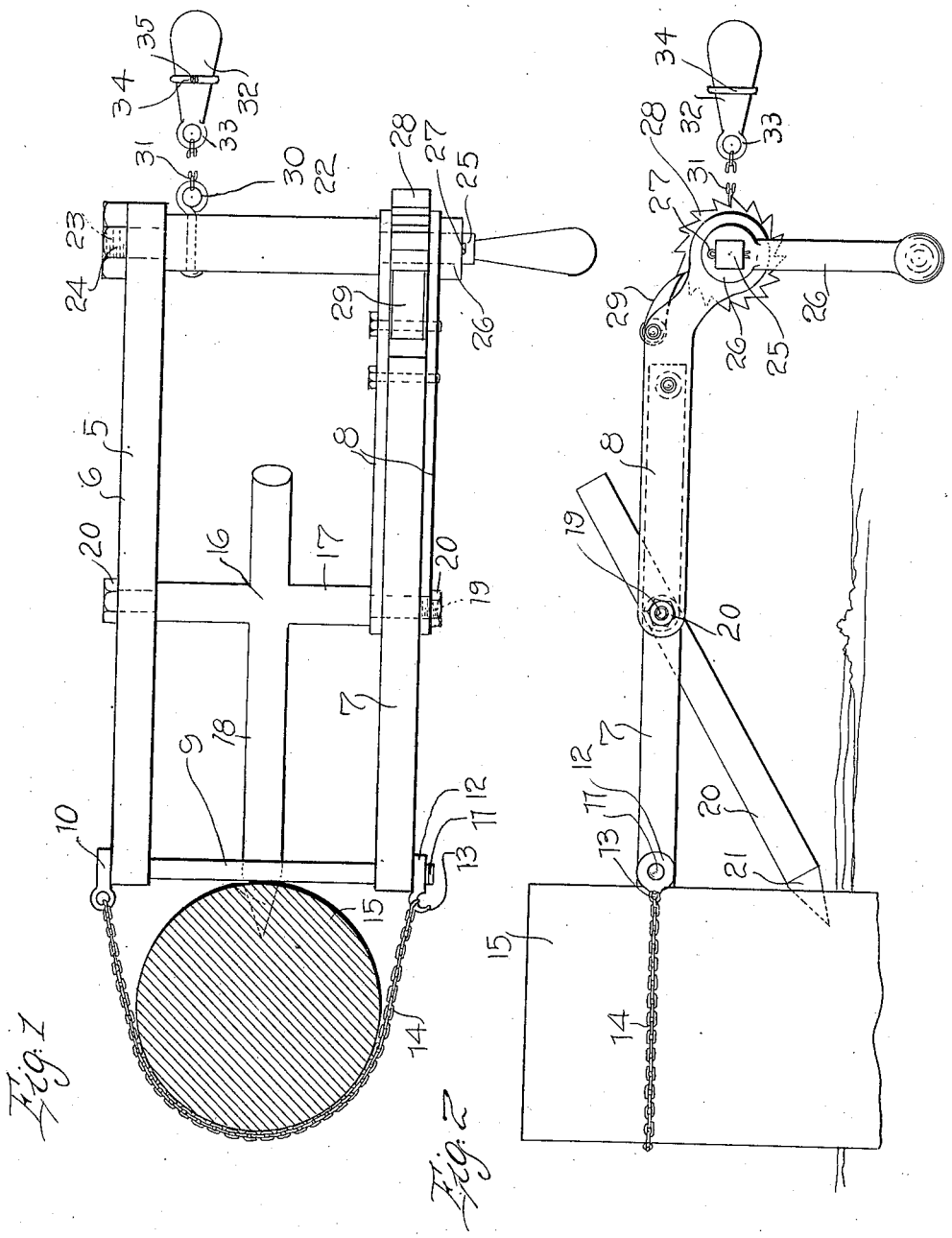

AIME T. QUESNOY, OF CAMBRIA, WYOMING.

WIRE-STRETCHER.

1,091,705.

Specification of Letters Patent.   Patented Mar. 31, 1914.

Application filed April 12, 1913.   Serial No. 760,789.

*To all whom it may concern:*

Be it known that I, AIME T. QUESNOY, a citizen of the United States, residing at Cambria, in the county of Weston and State of Wyoming, have invented certain new and useful Improvements in Wire-Stretchers, of which the following is a specification, reference being had to the accompanying drawings.

This invention relates to new and useful improvements in wire stretchers, and an object thereof is the provision of a device of this character comprising a frame having means secured to one end thereof whereby the frame may be supported upon a fence post, the opposite end of the frame supporting means for stretching the wire.

Another object of this invention is the provision of a device of this character comprising a pair of parallel bars, the bars being suitably connected by cross rods, the cross rod in one end of the frame being provided with an offset apertured lug at one end, and being threaded at its opposite end, the threaded end of the rod being adapted to receive a nut having a hooked extension, whereby a flexible connection may be secured in the apertured lug at one end and to the hooked nut at its opposite end, the intermediate portion of the connection extending around a post whereby the frame may be supported.

With these and other objects in view, my invention consists in certain novel constructions, combinations and arrangements of parts, to be hereinafter more fully described, claimed and illustrated in the accompanying drawing, in which Figure 1 is a top plan view of my invention; and Fig. 2 is a side elevation thereof.

Referring more particularly to the drawing, the numeral 5 designates generally the frame of my improved wire stretcher which consists of a pair of parallel bars 6 and 7, the bar 6 being relatively longer than the other bar. A pair of parallel plates 8 are secured to the rear end of the bar 7, the plates extending in parallel relation with the bar 6 to the end thereof. Connecting the forward end of the bars 6 and 7 is a cross rod 9 one end of which is formed with an enlarged head having a forwardly projecting apertured lug 10, and the opposite end thereof being threaded, as at 11, for the reception of a nut 12 which is adapted to bear against the outer face of the bar 7. The nut 12 is formed with a hook-shaped extension 13 and a chain 14 or other suitable flexible element is secured at one end in the aperture of the lug 10, the opposite end of the chain being secured to the hook-shaped extension 13 of the nut, the intermediate portion of the chain being adapted to extend around a post or other support designated by the numeral 15. A cross-shaped member 16 comprising a transversely extending bar 17 and a longitudinally extending bar 18 is disposed between the bars 6 and 7, the transversely extending bar 17 being provided with reduced threaded extensions 19 which project through openings in the bars 6 and 7, for the reception of nuts 20 which bear against the outer faces of the bars 6 and 7 whereby the cross-shaped member is rotatably mounted in the frame. The forward extremity of the bar 18 of the cross member is pointed, as at 21, for engagement in the fence post below the connecting rod 9. A connecting shaft 22 is arranged between the bars 6 and 7 at their rear ends, one end of the shaft being formed with a reduced threaded extension 23 for the reception of a nut 24 which is adapted to bear against the outer face of the bar 6, the opposite end of the shaft being formed with a reduced angular extension 25 which is adapted to pass through the plates 8, a crank 26 being mounted on the extremity of the extension and secured in position thereon by a cotter pin 27. Keyed to the shaft 22 between the plates 8 is a ratchet wheel 28 with which the pivotally mounted pawl 29 is adapted to engage to prevent rotation of the shaft 22 in one direction.

Passing transversely through the shaft near one end thereof is a pin 30 to one end of which a chain 31 is secured, the opposite end of the chain having a wire clamp connected thereto. The wire clamp comprises an annular tapered body 32 which is formed at its smaller end with an eye 33 for connection with the chain 31. Loosely disposed on the member 32 is a split ring 34, the diameter of which is relatively smaller than the diameter of the larger end of the annular member 32. The opposite ends of the ring are spaced to provide an opening 35 through which the wire of a fence may be passed when the ring is arranged in the smaller end of the member 32, the ring being thereupon turned so that the opening 35 is disposed opposite the wire, whereupon the ring is moved toward the larger end of the member to clamp the wire between the member and the ring. It will be seen that with a clamp of this construction, the wire is held by the clamp without danger of mutilating the wire, and pull upon the wire tends to tightly bind the wire between the ring and the body of the clamp.

In the practical use of my device, the pointed end of the stem 20 is engaged in the fence post or other support, and the chain 14 is passed around the post and connected to the hooked extension 13 of the nut 12, whereby the frame is rigidly supported upon the post. The clamp 32 is then engaged with the wire which is to be stretched, and upon rotation of the crank 26, the chain 31 is wound upon the sleeve 30 until the wire is stretched to the desired tension.

From the above description taken in connection with the accompanying drawing, it will be seen that the frame of the wire stretcher may be quickly taken apart, and that the rod 9 provides means whereby the frame may be secured to a suitable support and at the same time prevents separation of the forward ends of the bars 6 and 7 by the engagement of the lug 10 with the outer face of the bar 6 and the engagement of the nut 12 with the outer face of the bar 7.

While the construction illustrated in the accompanying drawing is the preferred embodiment of my invention, it will be understood that minor changes in construction may be resorted to, without departing from the spirit thereof or sacrificing any of its advantages as determined by the scope of the appended claim.

Having thus fully described my invention what I desire to claim and secure by Letters Patent is:

A device of the character described comprising a frame including a pair of parallel bars, means for connecting said bars to a suitable support, one of said bars being longer than the other, a pair of longitudinally extending plates secured to one end of the shorter bar, a shaft extending through said longer bar and said plates, a ratchet wheel keyed to said shaft between said plates, a pawl pivotally mounted between said plates and adapted for engagement with said ratchet wheel, a crank connected to one end of said shaft, and a clamp connected to said shaft, as and for the purpose described.

In testimony whereof I hereunto affix my signature in the presence of two witnesses.

AIME T. QUESNOY.

Witnesses:
GEORGE W. OUTWATER,
AARON W. CONAWAY.

Copies of this patent may be obtained for five cents each, by addressing the "Commissioner of Patents, Washington, D. C."